(12) United States Patent
Renie et al.

(10) Patent No.: US 11,494,284 B2
(45) Date of Patent: Nov. 8, 2022

(54) DYNAMIC CONFIGURATION TRACE CAPTURE TECHNIQUE

(71) Applicant: Metawork Corporation, Wilmington, DE (US)

(72) Inventors: David Michael Renie, Atherton, CA (US); David Marcin, Saratoga, CA (US); Nicholas DeMonner, Redwood City, CA (US); Margaret Henry, Redwood City, CA (US)

(73) Assignee: Metawork Corporation, Wilmington, DE (US)

( * ) Notice: Subject to any disclaimer, the term of this patent is extended or adjusted under 35 U.S.C. 154(b) by 183 days.

(21) Appl. No.: 16/929,584

(22) Filed: Jul. 15, 2020

(65) Prior Publication Data
US 2022/0019510 A1    Jan. 20, 2022

(51) Int. Cl.
*G06F 9/44*    (2018.01)
*G06F 11/34*    (2006.01)
(Continued)

(52) U.S. Cl.
CPC ........ *G06F 11/3466* (2013.01); *G06F 9/4411* (2013.01); *G06F 11/3636* (2013.01); *G06F 16/901* (2019.01)

(58) Field of Classification Search
None
See application file for complete search history.

(56) References Cited

U.S. PATENT DOCUMENTS

| 9,442,818 | B1* | 9/2016 | Doe | G06F 11/3466 |
| 2005/0261879 | A1* | 11/2005 | Shrivastava | G06F 11/366 |
| | | | | 714/E11.026 |

(Continued)

OTHER PUBLICATIONS

PCT Notification of Transmittal of the International Search Report and the Written Opinion of the International Searching Authority, or the Declaration, International Searching Authority, International Application No. PCT/US2021/039492, dated Oct. 8, 2021, 21 pages.

*Primary Examiner* — Qamrun Nahar
(74) *Attorney, Agent, or Firm* — Cesari and McKenna, LLP (57) ABSTRACT

A dynamic configuration trace capture technique enables software developers to monitor, diagnose and solve errors associated with application development and production. A client library of an investigative platform is loaded in a user application and interacts with an agent process to instrument executable code of the user application. A dynamic configuration specifies information, such as methods and associated arguments, variables and data (values), to instrument. The client library may re-load the dynamic configuration at the capture points, which may change the frequency of tracing a method and its associated information. The dynamic configuration may be defined per method, argument, variable, and/or data structure. The dynamic configuration may be initially deployed with default heuristics defined in the client library. The technique enables optional overrides, either by manual provision of adjustments by a user via a user interface infrastructure of the investigative platform, or as specified by the agent after retrieving a configuration file, an environment variable, etc. from a configuration service.

20 Claims, 5 Drawing Sheets

(51) Int. Cl.
  *G06F 16/901* (2019.01)
  *G06F 9/4401* (2018.01)
  *G06F 11/36* (2006.01)

(56) References Cited

U.S. PATENT DOCUMENTS

| | | | |
|---|---|---|---|
| 2011/0087927 A1* | 4/2011 | Arnold | G06F 11/366 714/38.1 |
| 2014/0317603 A1* | 10/2014 | Gataullin | G06F 11/3688 717/128 |
| 2019/0332519 A1* | 10/2019 | Myers | G06F 11/3636 |
| 2019/0332520 A1* | 10/2019 | Myers | G06F 11/3636 |

* cited by examiner

DYNAMIC CONFIGURATION TRACE CAPTURE TECHNIQUE

BACKGROUND

Technical Field

The present disclosure relates to software application development and production and, more specifically, to an investigative platform having observability tools configured to diagnose and solve errors associated with software application development and production.

Background Information

Conventional observability tools are typically used in both software development and production environments to infer internal states of an executing software application (e.g., executable code) from knowledge of external outputs. However, these tools generally have a limited view/observation of information for a user (software developer) to obtain sufficient information (e.g., internal state information) about executable code to correctly diagnose a malfunction. That is, the tools typically collect information, such as logs, metrics and traces, from the executable code at runtime with insufficient detail and independently. As a result, an integrated view of sufficient fidelity across the collected information is not possible to aid the malfunction diagnosis, especially with respect to a historical view of specific operations manifesting the malfunction. For example, the tools may capture exceptions raised by the executable code that indicate a malfunction, but the root cause may be buried in a history of specific data values and processing leading to the exception. As such, examining a voluminous history of invocations and data changes across the collected information is often necessary to successfully diagnose the malfunction. Moreover, in production these tools are not generally configured for arbitrarily detailed information capture in an "always on" manner, but rather are typically used for testing or similar short-lived activities and then turned off.

In addition, an issue may arise during use of the tools for which there is no "visibility," and where the time to address and repair such an issue (problem) and its impact may depend on how quickly the developer can acquire visibility of the problem. A typical approach involves the software developer receiving notification of the problem in the production application, finding and examining relevant source code, defining and installing new points for collecting information about the code, deploying code with these new points, reviewing subsequently collected information, inferring what portions of the code may be creating the malfunction, and finally implementing any corrections to the code typically iteratively until the malfunction ceases. The developer may thereafter review any issues related to collected information that is logged and reported but may find nothing abnormal in the collected information. This approach may be continually repeated to no avail, which often hampers and even discourages problem solving. As a result, there is a need for on-demand, arbitrarily detailed trace capture based on always-on historical capture during production and in development environments. Such capture would enable gathering of enough detail when necessary and rendering of the voluminous collected information efficiently with sufficiently integrated view for effective diagnosis and root cause determination.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments described herein are directed to a dynamic configuration trace capture technique configured to enable software developers to monitor, diagnose and solve errors associated with application development and production. A client library of an investigative platform is loaded in a user application executing on a virtual machine instance of a virtualized computing environment or, for other embodiments, on an actual computer/machine. The client library interacts with a separate agent process of the platform to instrument executable code (e.g., symbolic text, interpreted bytecodes, machine code and the like visible to the client library) of the user application and, to that end, loads a capture configuration (dynamic configuration) that specifies information such as, inter alia, methods and associated arguments, variables and data structures (values), to instrument. The client library inspects the executable code to determine portions of the code to instrument based on rules or heuristics of the dynamic configuration, which represent a degree of fidelity (e.g., a frequency) of the executable code and information to trace at runtime. Capture points of the runtime application are implemented as callback functions (callbacks) to the client library, which are registered with a runtime system executing the user application.

Illustratively, the client library may examine a language runtime stack and associated call history during a capture interval, i.e., a method execution event triggering the callback, and gather symbolic information, e.g., symbols and associated source code (when available) from the runtime system, invocations of methods, arguments/variables (including local and instance variables) and return values of the methods, as well as any exceptions raised based on a capture filter. In an embodiment, the capture filter is a table having identifiers associated with the methods to instrument, such that presence of a particular identifier in the table results in trace capture of the method associated with the identifier during the capture interval. When an exception is raised, the client library captures detailed information for every method in the stack, even if it was not instrumented in detail initially. The client library may also inspect language runtime internals to determine values of data structures used by the application. In an embodiment, the dynamic configuration for data structures involves walking the structures based on a defined level of nesting (e.g., depth of the data structures) which may be specified per data structure type, instance, method, and the like. All gathered information and executed executable code are transferred to the agent process via shared memory and/or Inter Process Communication (such as message passing via sockets, pipes and the like) to isolate the capture from the executing user application. The captured trace information may be reported graphically and interactively to a user via a user interface infrastructure of the investigative platform.

In an embodiment, the client library may re-load the dynamic configuration at the capture points, which may change a frequency of tracing a method and its associated information (e.g., call parameters, local variables). In addition, the configuration may be defined per method, argument, variable, and/or data structure. The dynamic configuration may be initially deployed with default heuristics defined in the client library. The technique enables optional overrides, either by provision of manual adjustments by a user via a user interface (UI) infrastructure of the investigative platform, or as specified by the agent after retrieving a configuration file, an environment variable, etc. from a configuration service. The dynamic configuration may be modified directly or via the UI infrastructure.

DESCRIPTION

The disclosure herein is generally directed to an investigative platform having observability tools that enable software developers to monitor, investigate, diagnose and remedy errors as well as other deployment issues including code review associated with application development and production. In this context, an application (e.g., a user application) denotes a collection of interconnected software processes or services, each of which provides an organized unit of functionality expressed as instructions or operations, such as symbolic text, interpreted bytecodes, machine code and the like, which is defined herein as executable code and which is associated with and possibly generated from source code (i.e., human readable text written in a high-level programming language) stored in repositories. The investigative platform may be deployed and used in environments (such as, e.g., production, testing, and/or development environments) to facilitate creation of the user application, wherein a developer may employ the platform to provide capture and analysis of the operations (contextualized as "traces") to aid in executable code development, debugging, performance tuning, error detection, and/or anomaly capture managed by issue.

In an exemplary embodiment, the investigative platform may be used in a production environment which is executing (running) an instance of the user application. The user application cooperates with the platform to capture traces (e.g., execution of code and associated data/variables) used to determine the cause of errors, faults and inefficiencies in the executable code and which may be organized by issue typically related to a common root cause. To that end, the investigative platform may be deployed on hardware and software computing resources, ranging from laptop/notebook computers, desktop computers, and on-premises ("on-prem") compute servers to, illustratively, data centers of virtualized computing environments.

Figure 1:
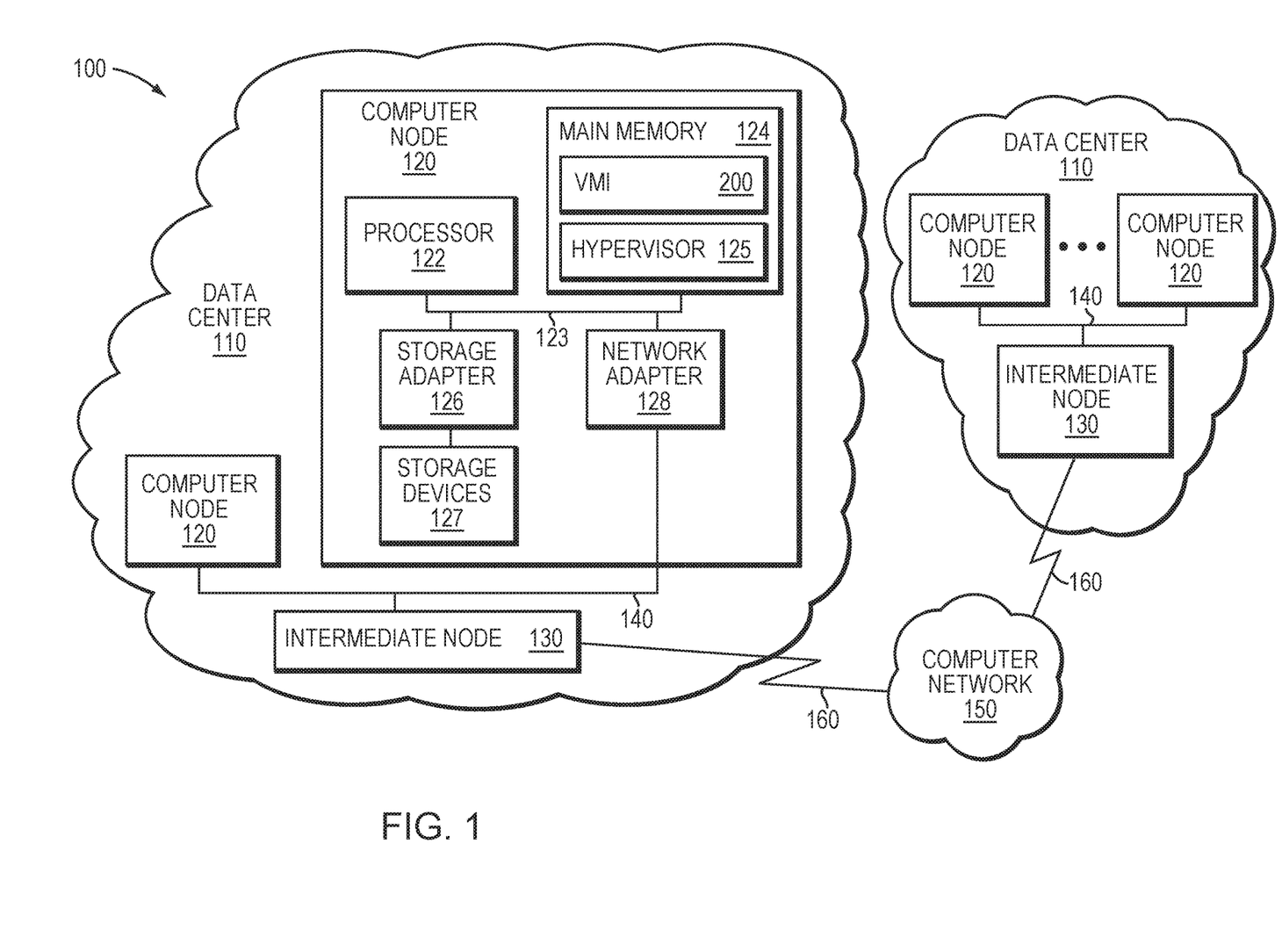
FIG. 1 is a block diagram of a virtualized computing environment.

FIG. 1 is a block diagram of a virtualized computing environment 100. In one or more embodiments described herein, the virtualized computing environment 100 includes one or more computer nodes 120 and intermediate or edge nodes 130 collectively embodied as one or more data centers 110 interconnected by a computer network 150. The data centers may be cloud service providers (CSPs) deployed as private clouds or public clouds, such as deployments from Amazon Web Services (AWS), Google Compute Engine (GCE), Microsoft Azure, typically providing virtualized resource environments. As such, each data center 110 may be configured to provide virtualized resources, such as virtual storage, network, and/or compute resources that are accessible over the computer network 150, e.g., the Internet. Each computer node 120 is illustratively embodied as a computer system having one or more processors 122, a main memory 124, one or more storage adapters 126, and one or more network adapters 128 coupled by an interconnect, such as a system bus 123. The storage adapter 126 may be configured to access information stored on storage devices 127, such as magnetic disks, solid state drives, or other similar media including network attached storage (NAS) devices and Internet Small Computer Systems Interface (iSCSI) storage devices. Accordingly, the storage adapter 126 may include input/output (I/O) interface circuitry that couples to the storage devices over an I/O interconnect arrangement, such as a conventional peripheral component interconnect (PCI) or serial ATA (SATA) topology.

The network adapter 128 connects the computer node 120 to other computer nodes 120 of the data centers 110 over local network segments 140 illustratively embodied as shared local area networks (LANs) or virtual LANs (VLANs). The network adapter 128 may thus be embodied as a network interface card having the mechanical, electrical and signaling circuitry needed to connect the computer node 120 to the local network segments 140. The intermediate node 130 may be embodied as a network switch, router, firewall or gateway that interconnects the LAN/VLAN local segments with remote network segments 160 illustratively embodied as point-to-point links, wide area networks (WANs), and/or virtual private networks (VPNs) implemented over a public network (such as the Internet). Communication over the network segments 140, 160 may be effected by exchanging discrete frames or packets of data according to predefined protocols, such as the Transmission Control Protocol/Internet Protocol (TCP/IP) and the User Datagram Protocol (UDP), although other protocols, such as the OpenID Connect (OIDC) protocol, the HyperText Transfer Protocol Secure (HTTPS), HTTP/2, and the Google Remote Procedure Call (gRPC) protocol may also be advantageously employed.

The main memory 124 includes a plurality of memory locations addressable by the processor 122 and/or adapters for storing software programs (e.g., user applications, processes and/or services) and data structures associated with the embodiments described herein. As used herein, a process (e.g., a user mode process) is an instance of a software program (e.g., a user application) executing in the operating system. The processor and adapters may, in turn, include processing elements and/or circuitry configured to execute the software programs, including an instance of a virtual machine and a hypervisor 125, and manipulate the data structures. The virtual machine instance (VMI) 200 is managed by the hypervisor 125, which is a virtualization platform configured to mask low-level hardware operations and provide isolation from one or more guest operating systems executing in the VMI 200. In an embodiment, the hypervisor 125 is illustratively the Xen hypervisor, although other types of hypervisors, such as the Hyper-V hypervisor and/or VMware ESX hypervisor, may be used in accordance with the embodiments described herein. As will be understood by persons of skill in the art, in other embodiments, the instance of the user application may execute on an actual (physical) machine.

It will be apparent to those skilled in the art that other types of processing elements and memory, including various computer-readable media, may be used to store and execute program instructions pertaining to the embodiments described herein. Also, while the embodiments herein are described in terms of software programs, processes, services and executable code stored in memory or on storage devices, alternative embodiments also include the code, services, processes and programs being embodied as logic, components, and/or modules consisting of hardware, software, firmware, or combinations thereof.

Figure 2:
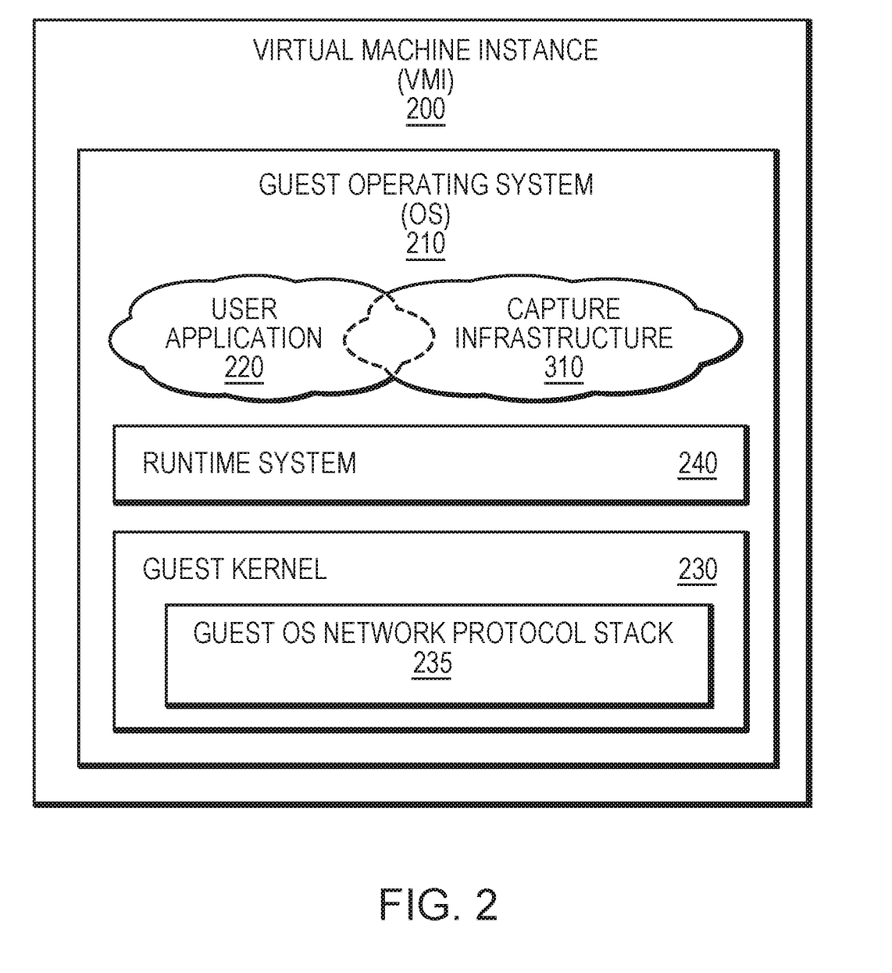
FIG. 2 is a block diagram of the virtual machine instance.

FIG. 2 is a block diagram of the virtual machine instance (VMI) 200. In an embodiment, guest operating system (OS) 210 and associated user application 220 may run (execute) in the VMI 200 and may be configured to utilize system (e.g., hardware) resources of the data center 110. The guest OS 210 may be a general-purpose operating system, such as FreeBSD, Microsoft Windows®, macOS®, and similar operating systems; however, in accordance with the embodiments described herein, the guest OS is illustratively the Linux® operating system. A guest kernel 230 of the guest OS 210 includes a guest OS network protocol stack 235 for exchanging network traffic, such as packets, over computer network 150 via a network data path established by the network adapter 128 and the hypervisor 125. Various data center processing resources, such as processor 122, main memory 124, storage adapter 126, and network adapter 128, among others, may be virtualized for the VMI 200, at least partially with the assistance of the hypervisor 125. The hypervisor may also present a software interface for processes within the VMI to communicate requests directed to the hypervisor to access the hardware resources.

A capture infrastructure 310 of the investigative platform may be employed (invoked) to facilitate visibility of the executing user application 220 by capturing and analyzing traces of the running user application, e.g., captured operations (e.g., functions and/or methods) of the user application and associated data/variables (e.g., local variables, passed parameters/arguments, etc.) In an embodiment, the user application 220 may be created (written) using an interpreted programming language such as Ruby, although other compiled and interpreted programming languages, such as C++, Python, Java, PHP, and Go, may be advantageously used in accordance with the teachings described herein. Illustratively, the interpreted programming language has an associated runtime system 240 within which the user application 220 executes and may be inspected. The runtime system 240 provides application programming interfaces (APIs) to monitor and access/capture/inspect (instrument) operations of the user application so as to gather valuable information or "signals" from the traces (captured operations and associated data), such as arguments, variables and/or values of procedures, functions and/or methods. A component of the capture infrastructure (e.g., a client library) cooperates with the programming language's runtime system 240 to effectively instrument (access/capture/inspect) the executable code of the user application 220.

As described further herein, for runtime systems 240 that provide first-class support of callback functions ("callbacks"), callbacks provided by the client library may be registered by the user application process of the guest OS 210 when the executable code is loaded to provide points of capture for the running executable code. Reflection capabilities of the runtime system 240 may be used to inspect file path(s) of the executable code and enumerate the loaded methods at events needed to observe and capture the signals. Notably, a fidelity of the captured signals may be configured based on a frequency of one or more event-driven capture intervals and/or a selection/masking of methods/functions to capture, as well as selection/masking, type, degree and depth of associated data to capture. The event-driven intervals invoke the callbacks, which filter information to capture.

The events may be triggered by method invocation, method return, execution of a new line of code, raising of exceptions, and periodic (i.e., time based). For languages that do not provide such first-class callback support, a compiler may be modified to insert callbacks as "hooks" such that, when processing the executable code, the modified compiler may generate code to provide initial signals passed in the callbacks to the client library, as well as to provide results from the callbacks to the client library. In other embodiments, the callbacks may be added at runtime, by employing proxy methods (i.e., wrapping invocations of the methods to include callbacks at entry and/or exit of the methods) in the executable code. Moreover, the client library (which is contained in the same process running the user application 220) may examine main memory 124 to locate and amend (rewrite) the executable code and enable invocation of the callbacks to facilitate instrumentation on behalf of the investigative platform.

Figure 3:
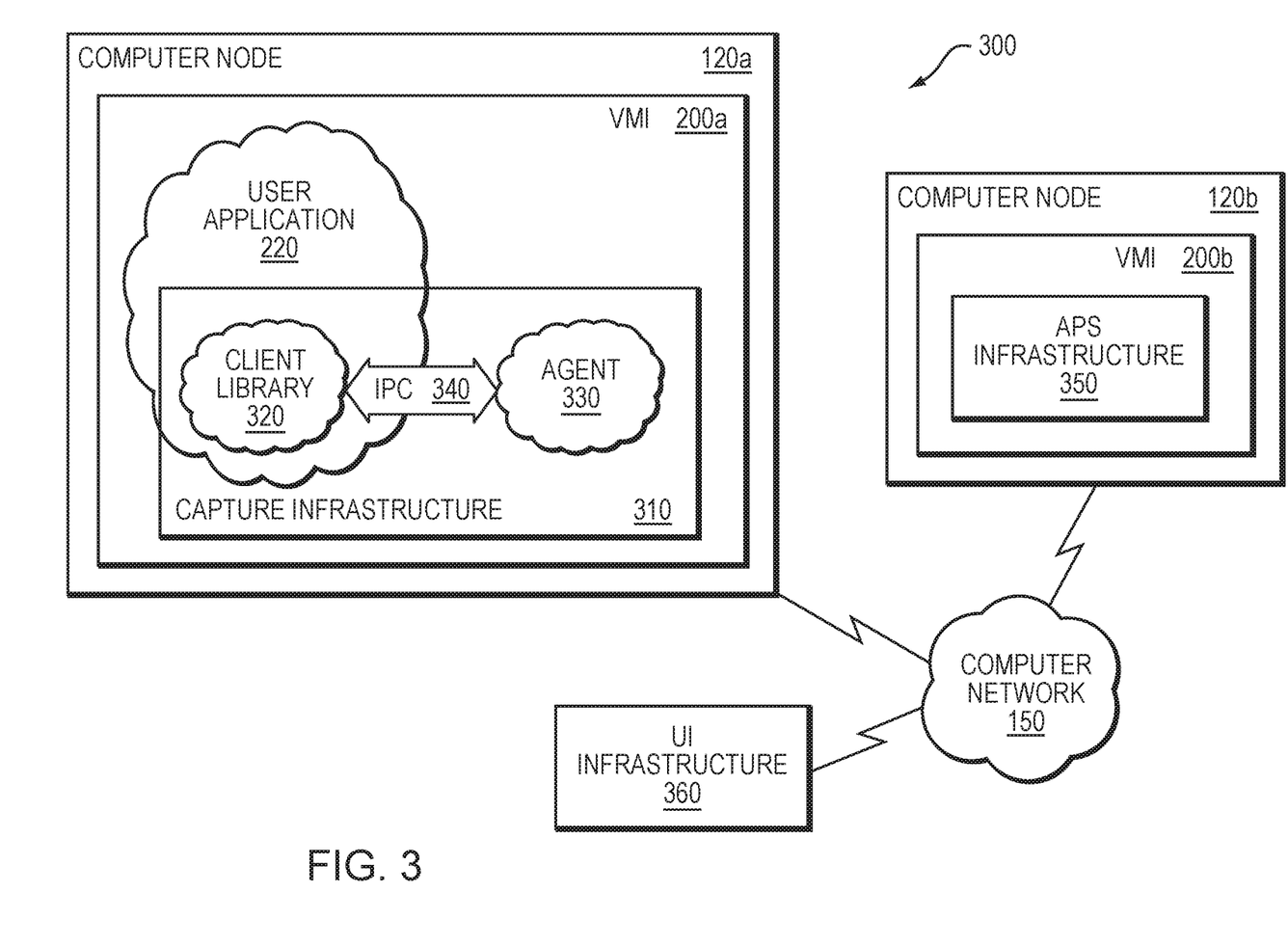
FIG. 3 is a block diagram of an investigative platform.

FIG. 3 is a block diagram of the investigative platform 300. In one or more embodiments, the investigative platform 300 includes the capture infrastructure 310 in communication with (e.g. connected to) an analysis and persistent storage (APS) infrastructure 350 as well as a user interface (UI) infrastructure 360 via computer network 150. Illustratively, the capture infrastructure 310 includes a plurality of components, such as the client library 320 and an agent 330, that interact (e.g., through the use of callbacks) to instrument the running executable code visible to the client library, initially analyze traces captured through instrumentation, compress and thereafter send the traces via the computer network 150 to the APS infrastructure 350 for comprehensive analysis and storage. The APS infrastructure 350 of the investigative platform 300 is configured to provide further multi-faceted and repeatable processing, analysis and organization, as well as persistent storage, of the captured traces. The UI infrastructure 360 allows a user to interact with the investigative platform 300 and examine traces via comprehensive views distilled by the processing, analysis and organization of the APS infrastructure 350. The capture infrastructure 310 illustratively runs in a VMI 200a on a computer node 120a that is separate and apart from a VMI 200b and computer node 120b on which the APS infrastructure 350 runs. Note, however, that the infrastructures 310 and 350 of the investigative platform 300 may run in the same or different data center 110.

In an embodiment, the client library 320 may be embodied as a software development kit (SDK) that provides a set of tools including a suite of methods that software programs, such as user application 220, can utilize to instrument and analyze the executable code. The client library 320 illustratively runs in the same process of the user application 220 to facilitate such executable code instrumentation and analysis (work). To reduce performance overhead costs (e.g., manifested as latencies that may interfere with user application end user experience) associated with executing the client library instrumentation in the user application process, i.e., allocating the data center's processing (e.g., compute, memory and networking) resources needed for such work, the client library queries the runtime system 240 via an API to gather trace signal information from the system, and then performs a first dictionary compression and passes the compressed signal information to an agent 330 executing in a separate process. The agent 330 is thus provided to mitigate the impact of work performed by the client library 320, particularly with respect to potential failures of the user application.

Illustratively, the agent 330 is spawned as a separate process of the guest OS 210 to the user application 220 and provides process isolation to retain captured traces in the event of user process faults, as well as to prevent unexpected processing resource utilization or errors from negatively impacting execution of the user application 220. As much processing as possible of the captured traces of the executable code is offloaded from the client library 320 to the agent 330 because overhead and latency associated with transmission of information (e.g., the captured traces) between operating system processes is minimal as compared to transmission of the information over the computer network 150 to the APS infrastructure 350. In an embodiment, the client library 320 and agent 330 may communicate (e.g., transmit information) via an Inter Process Communication (IPC) mechanism 340, such as shared memory access or message passing of the captured trace signals. Thereafter, the agent 330 may perform further processing on the captured traces, such as a second dictionary compression across captured traces, and then send the re-compressed captured traces to the APS infrastructure 350 of the investigative platform 300 over the computer network 150 for further processing and/or storage.

The embodiments described herein are directed to a dynamic configuration trace capture technique configured to enable software developers to monitor, diagnose and solve errors associated with application development and production. A user links the client library 320 to the user application 220, e.g., after the client library is loaded into a process of the application and, thereafter, the client library (at initialization and thereafter on-demand) loads a dynamic configuration that specifies information such as, inter alia, methods and associated arguments, variables and data structures (values) to instrument as well as a fidelity of capture (i.e., a frequency and degree or amount of the information detail to gather of the running application) expressed as rules. Essentially, the dynamic configuration acts as a filter to define the type and degree of information to capture. The client library 320 inspects the executable code to determine portions of the code to instrument based on the rules or heuristics of the dynamic configuration. Capture points of the runtime application are implemented as callbacks to the client library 320 which, as noted, are registered with the runtime system executing the user application 220 and invoked according to the dynamic configuration. The dynamic configuration may be loaded from various sources, such as from the agent 330, the APS infrastructure 350, and/or via user-defined sources such as files, environment variables and graphically via the UI infrastructure 360.

Figure 4:
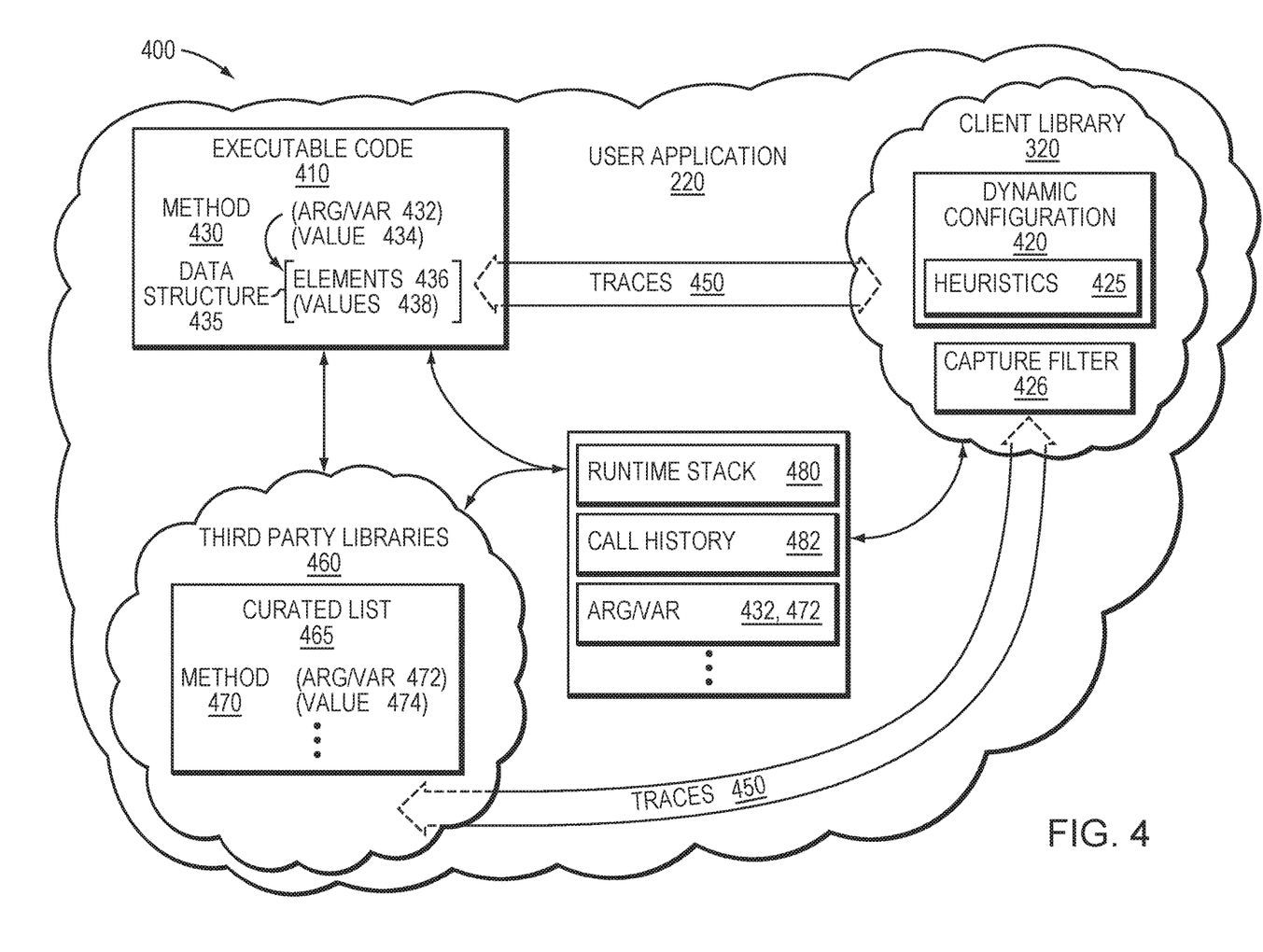
FIG. 4 illustrates a workflow for instrumenting executable code using a dynamic configuration in accordance with a dynamic configuration trace capture technique.

FIG. 4 illustrates a workflow 400 for instrumenting executable code 410 using a dynamic configuration 420 in accordance with the instrumentation trace capture technique. Since there is only a finite amount of processing resources available for the client library 320 to perform its work, the technique optimizes the use of the processing resources in accordance with the dynamic configuration 420, which represents a degree of fidelity of executable code 410 and information to capture at runtime as traces of the executing methods and data of the executable code. In one or more embodiments, default rules or heuristics 425 of the configuration 420 are employed to dynamically capture the traces 450, wherein the default heuristics 425 may illustratively specify capture of (i) all methods 430 of the executable code 410 as well as (ii) certain dependencies on one or more third-party libraries 460 that are often mis-invoked (i.e., called with incorrect parameters or usage). A capture filter 426 is constructed (i.e., generated) from the dynamic configuration based on the heuristics. Changes to the dynamic configuration 420 may be reloaded during the capture interval and the capture filter re-generated. In this manner, the executable code 410 may be effectively re-instrumented on-demand as the capture filter screens the traces 450 to capture.

Illustratively, the capture filter 426 may be embodied as a table having identifiers associated with methods to instrument, such that presence of a particular identifier in the table results in trace capture of the method associated with the identifier during the capture interval. That is, the capture filter is queried (e.g., the capture table is searched) during the capture interval to determine whether methods of the event driving the capture interval are found. If the method is found in the capture filter 426, a trace 450 is captured (i.e., recorded). Notably the method identifiers may depict the runtime system representation of the method (e.g., symbols) or a memory address for a compiled user application and runtime environment. In an embodiment, the capture filter may be extended to include capture filtering applied to arguments, variables, data structures and combinations thereof.

A default dynamic configuration is based on providing a high fidelity (i.e., capture a high trace detail) where there is a high probability of error. As such, the dynamic configuration may trade-off "high-signal" information (i.e., information very useful to debugging, analyzing and resolving errors) against consistently capturing a same level of detail of all invoked methods. For example, the third-party libraries 460 (such as, e.g., a standard string library or regular expression library) are typically widely used by software developers and, thus, are generally more reliable and mature than the user application 220 but are also likely to have incorrect usage by the user application. As a result, the heuristics 425 primarily focus on methods 430 of the user application's executable code 410 based on the assumption that it is less developed and thus more likely where errors or failures are to arise. The heuristics 425 (and capture filter 426) are also directed to tracing invocation of methods of the third-party libraries 460 by the user application via a curated list 465 of methods 470 of the third-part library having arguments/variables (arg/var) 472 and associated values 474 deemed as valuable (high-signal) for purposes of debugging and analysis. Notably the curated list 465 may be folded into the capture filter 426 during processing/loading of the dynamic configuration 420. That is, the curated list includes high-signal methods of the third-party library most likely to be mis-invoked (e.g., called with incorrect calling parameters) and, thus, benefits debugging and analysis of the user application 220 that uses the curated high-signal method. The technique utilizes the available processing resources to capture these high-signal method/value traces 450.

Illustratively, the client library 320 may examine a language runtime stack 480 and associated call history 482 using, e.g., inspection APIs, to query the runtime system during a capture interval to gather symbolic information, i.e., symbols and associated source code (when available), from the runtime system 240, invocations of methods 430, 470, associated arguments/variables 432, 472 (including local and instance variables), return values 434, 474 of the methods, and any exceptions being raised. Notably, the gathered symbolic information of a captured trace may include one or more of (i) high-level programming text processed by the runtime system, which may be derived (generated) from source code stored in repositories; and (ii) symbols as labels representing one or more of the methods, variables, data and state of the executable code. When an exception is raised, the client library 320 captures detailed information for every method in the stack 480, even if was not instrumented in detail initially as provided in the dynamic configuration 420. That is, fidelity of trace capture is automatically increased (e.g., from a first level to a second level) during the capture interval in response to detecting a raised exception. Note that in some embodiments, this automatic increase in trace capture detail may be overridden (superseded) in the dynamic configuration by a manual override. In some embodiments, the runtime system executable code 410 may have limited human readability (i.e., may not be expressed in a high-level programming language) and, in that event, mapping of symbols and references from the executable code 410 to source code used to generate the executable code may be gathered from the repositories by the APS infrastructure 350 and associated with the captured trace.

The client library 320 may also inspect language runtime internals to determine values of data structures used by the application 220. In an embodiment, the dynamic configuration 420 for data structures may involve "walking" the structures and capturing information based on a defined level of nesting (e.g., a nested depth of the data structures) which may be specified per data structure type, instance and/or method as provided in the dynamic configuration 420. As stated previously for language implementations that do not provide first-class callback support, a compiler may be modified to insert callbacks as "hooks" such that, when processing the executable code 410, the modified compiler may generate code to provide initial signals passed in the callbacks to the client library 320 which may inspect the stack 480 directly (e.g., examine memory locations storing the stack). In other embodiments, the client library may add callbacks at runtime in the executable code via proxy methods (i.e., wrapping invocations of the methods to include the callbacks at entry and/or exit of the methods).

In an embodiment, the client library 320 may re-load the dynamic configuration 420 during the callbacks at the capture points, which may change the heuristics 425 to, for example, adjust the frequency of tracing a method and its associated information (e.g., local variables, etc.) and/or selection/masking of methods/functions to capture, as well as selection/masking, type, degree and depth of associated data to capture. The re-loaded dynamic configuration 420 may be defined per method 430, argument/variable 432, and/or data structure 435. Processing decisions regarding adjustments to the dynamic configuration 420 may be performed by the agent 330 and/or APS infrastructure 350, which are pushed to the dynamic configuration 420 and then loaded (i.e., read) by the client library 320 at an event. In an embodiment, the client library 320 has sufficient functionality to perform the trace captures, and capture filtering decisions regarding, e.g., the level of nesting performed by the client library 320 and the definition of a high-signal method for configuration, may be determined and adjusted by the agent 330 and/or APS infrastructure 350, which then push changes in the dynamic configuration to the client library. If a push mechanism is unavailable, the client library 320 can poll periodically for configuration updates. As a result, the client library 320 is configured to perform minimal processing and analysis, whereas most substantive processing (either diagnostically or heuristically) is performed by the agent (a first stage of analysis, subject to constraints of complexity) or the APS infrastructure (a second stage of analysis having generally a greater complexity than the first stage performed in the agent). Notably, the technique enables optional overrides, by manual provision of adjustments and/or values by a user via the UI infrastructure 360 of the investigative platform 300 or via a configuration file, and/or an environment variable.

As noted, the dynamic configuration 420 may be initially deployed with default heuristics and configuration values that are defined in the client library 320. In one or more embodiments, manual configuration can be set locally by specifying the configuration values in environment variables, a local configuration file or through the UI infrastructure 360, and then received by the client library 320 on event-driven (re)load in the callback. For example, the user could change heuristics to limit an amount of data to capture during the capture interval from a data structure 435, such as an array, by setting a maximum number of array element values to capture as specified in an environment variable (e.g., MAX_ARRAY_CAPTURE=10), and/or from a hierarchical (i.e., nested) data structure 435 by setting a maximum depth of capture in another environment variable (e.g., MAX_STRUCT_DEPTH_CAPTURE=5). That is, limits on data gathering during the capture interval may be defined by quantity (e.g., max elements to capture) or measure (e.g., max structure depth to capture).

In an embodiment, the user may apply capture limitations or other heuristics via a configuration file, environment variables, or the UI infrastructure according to a predefined order of precedence. The user may also specify that one or more heuristics (e.g., the maximum array capture) apply to a particular objects, methods, variables, and data structures, but leave the corresponding default heuristic to apply to remaining objects. For example, MAX_ARRAY_CAPTURE may be applied to arrays having a symbolic name matching a specific pattern according to a regular expression specified by the user, but arrays with symbolic names that do not match the regular expression are accorded the default heuristic regarding maximum array capture according to the order of precedence for applying sources of configuration (e.g., environment variables, configuration files, UI infrastructure).

Illustratively, a manual override of the default heuristics of the dynamic configuration 420 allows a user to issue a manual override of the dynamic configuration, e.g., via the UI infrastructure 360 of the investigative platform 300, that adjusts the heuristics 425 to allow for altering instrumentation of one or more portions of the executable code 410. In this manner, the manual override acts as a highest order of precedence in applying the sources of configuration. The manual override feature is particularly useful for a higher degree of visibility (manifested by more detailed code instrumentation than that of the default heuristics) into, e.g., a method 430 or data structure 435 for debugging and analysis. Such detailed information may be critical to understanding and repairing code malfunctions despite any adverse performance impact (e.g., latency increase) due to higher resource utilization (i.e., increased gathering of capture information) of servicing the manual override change to the dynamic configuration. In response to the manual override, the client library 320 collects the detailed information (e.g., via traces 450 at capture points) from the executable code 220 according to manual override changes applied to the dynamic configuration, which may prove valuable to debug, analyze and repair such failures. In an embodiment, the manual override may be accorded a priority over an instrumentation resource consumption overhead limitation. That is, the manual override may be applied notwithstanding a performance impact on the user application process running the executable code.

For other less-critical situations where the detailed instrumentation arising from the manual override may result in a substantial performance impact on the user application process, the technique may be configured to ensure that the manual override adjustments do not consume resources that exceed a predetermined threshold of instrumentation overhead (overhead consumption). Illustratively, the client library 320 cooperates with the UI infrastructure 360 to implement the threshold in terms of relative constraints, such as limiting resource utilization of the override to not more than, e.g., 50% of resources, such as processor, memory and/or network bandwidth, as well as in terms of absolute constraints, such as limiting the override to a predetermined capture interval time of duration, e.g., 200 milliseconds or less.

In an embodiment, the dynamic configuration trace capture technique enables update of the heuristic adjustments and threshold constraints during execution of the user application, i.e., in a "live" system, at each capture interval (i.e., during the callback to the client library). No alteration to the executable code 410 or re-load/re-start of the user application 220 is needed in order to reflect the adjustments and constraints to dynamic configuration by the manual override. This feature of the investigative platform 300 provides an observability tool that enables collection of information to effect repair of errors and remedy of failures not expected to occur. Illustratively, the heuristic adjustments and/or threshold constraints may be entered via the UI infrastructure 360, and thereafter an administrative facility of the UI infrastructure 360 dynamically applies the heuristics and constraints, subject to the order of precedence to the dynamic configuration 420 for loading by the client library 320 to use when instrumenting the executable code 410.

In one or more embodiments, the dynamic configuration adjustments may be UI-driven or implemented via a configuration file. That is, the user may express custom configuration through editing a configuration file to replace default heuristics of the dynamic configuration 420 with user-specific defaults. Yet, the investigative platform 300 allows overriding of the user-specific defaults with configuration adjustments to the heuristics that are entered dynamically into, e.g., a standard UI of the UI infrastructure 360. In addition, the UI infrastructure allows a user to observe an expected cost (e.g., expressed as a resource consumption overhead) of trace capture by providing temporal and resource utilization impact estimates of the adjustments to the dynamic configuration. For example, the standard UI of the infrastructure 360 may display the expected resource (e.g., processor) utilization when proposed heuristics changes are applied, such as increasing a maximum depth of capture of nesting for a particular data structure 435.

Figure 5:
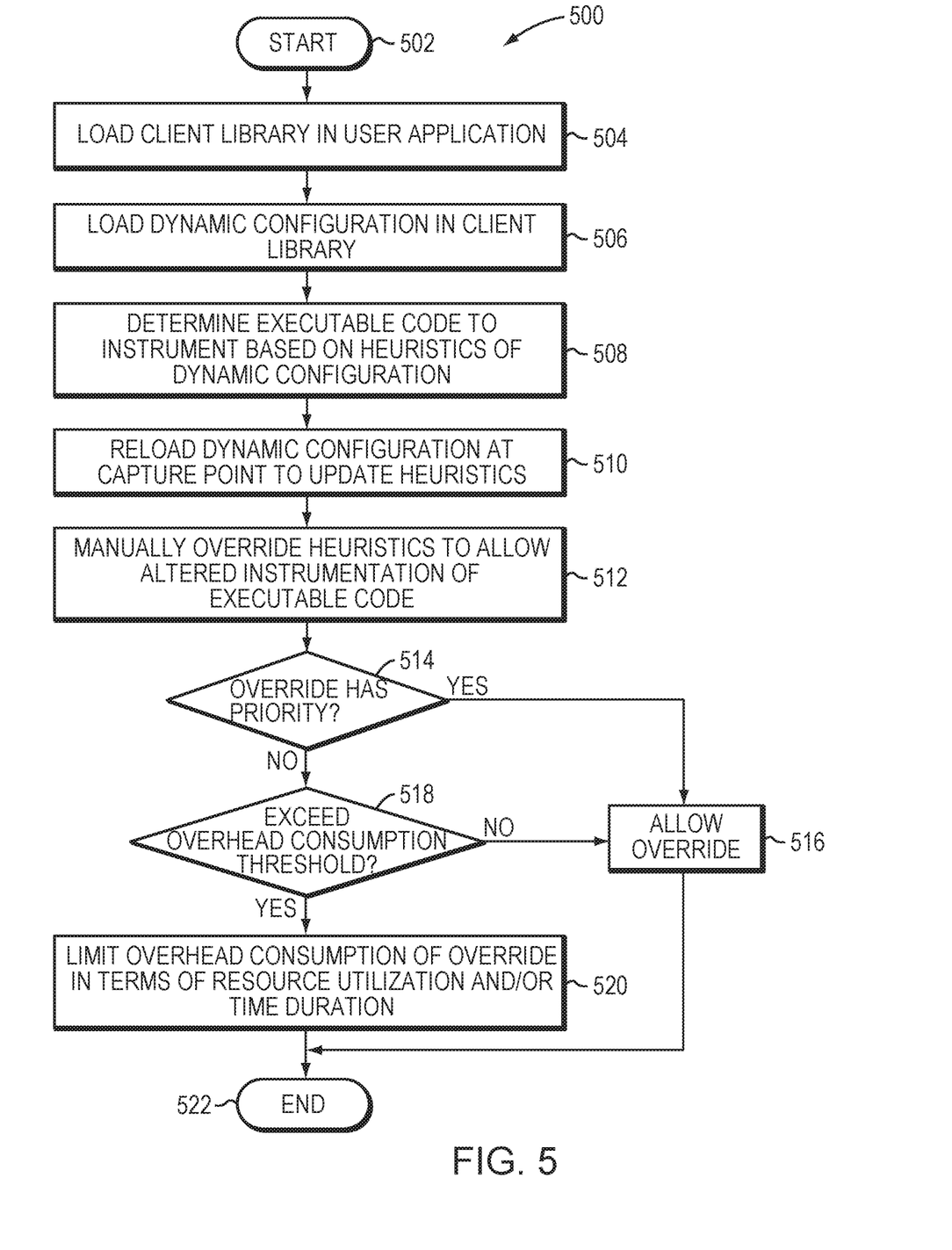
FIG. 5 is an example simplified procedure for monitoring, diagnosing, and solving errors associated with application development and production in accordance with the dynamic configuration trace capture technique.

FIG. 5 is an example simplified procedure for monitoring, diagnosing, and resolving errors associated with application development and production in accordance with the dynamic configuration trace capture technique. The procedure 500 starts at block 502 and proceeds to block 504 where the client library is loaded in the user application and, at block 506, the dynamic configuration is loaded in the client library according to order of precedence from dynamic configuration sources (e.g., configuration file, environment variables, and/or the UI infrastructure). At block 508, the client library inspects the executable code to determine portions of the code to instrument based on heuristics of the dynamic configuration. As noted, default heuristics of the dynamic configuration may be initially employed to dynamically capture the traces, wherein the heuristics may illustratively specify capture of all methods of the executable code, as well as certain dependencies on one or more third-party libraries.

At block 510, the client library may re-load the dynamic configuration at a capture point to update, inter alia, the heuristics with respect to, e.g., the frequency of instrumentation (tracing) of a method and its associated information. At block 512, the user may issue an override request, e.g., via the UI infrastructure, to manually override the heuristics of the dynamic configuration to allow further adjustment (e.g., increase frequency of instrumenting methods) to instrumentation into one or more portions of the executable code. At decision block 514, a determination is rendered as to whether the manual override has priority over consumption thresholds. If so, the override is allowed at block 516 and the procedure ends at block 522. However, if the manual override does not have priority over the consumption thresholds (i.e., is intended for less-critical situations), a determination is rendered (at decision block 518) as to whether the override adjustment exceeds a predetermined threshold of overhead consumption. If not, the override is allowed at block 518 and the procedure ends at block 522. Otherwise, at block 520, the UI infrastructure cooperates with the client library to limit the overhead consumption of the override in terms of resource utilization and/or time duration. The procedure then ends at block 522.

Advantageously, the dynamic configuration trace capture technique provides a context-sensitive, dynamically adjustable configuration 420 of the investigative platform 300 that can automatically instrument traces 450 in a user application's executable code 410. Additionally, the technique provides an improved mode of debugging wherein a user (developer) can employ the investigative platform 300 to implement a manual dynamic configuration override and request substantial detail for a particular area of the executable code 410, e.g., methods 430 or data structures 435. In response, the client library 320 acquires the information for the user to observe via the UI infrastructure 360 without having to endure the potentially onerous procedure of the prior art approaches that require modification and restart of the executable code. Notably, the investigative platform 300 can be used to proactively inspect a state of the user application 220 that occurred at some time in the past (i.e., before the user has sufficient knowledge to intervene and increase instrumentation to capture sufficient state of the user application) as opposed to the prior art approach that is directed to reactive (i.e., after the fact) problem debugging and analysis. Moreover, implementation of the investigative platform 300 is agnostic to cloud deployment such that the platform may be used across many different virtualized computing environments 100 to capture detailed information about a user application 220.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, and/or electronic memory) having program instructions executing on is a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

instrumenting executable code of an application to capture traces of execution of the application on a computer node having a memory, wherein instrumenting of the executable code is in accordance with a dynamic configuration including a prior representation of a first level of fidelity of trace capture;

establishing one or more callbacks to a client library as one or more event-driven capture intervals of the traces during execution of the application, wherein the client library is loaded into a process of the application;

capturing a first trace of execution during a first capture interval via the callback to the client library according to the prior representation of the dynamic configuration to capture the first level of fidelity of trace capture for the first trace;

modifying the prior representation of the dynamic configuration to a second level of fidelity of trace capture;

capturing a second trace of execution during a second capture interval via the callback to the client library according to the modified representation of the dynamic configuration, wherein the modified representation is loaded into the client library and supersedes the prior representation to capture the second level of fidelity of trace capture for the second trace, wherein the process of the application remains running;

compressing the traces via the callback to the client library; and sending the traces to an agent process via the callback to the client library, the agent process and application process executing on a same operating system.

2. The method of claim 1 wherein the first and second traces capture execution of one or more of a same method, a same variable, or a same data structure.

3. The method of claim 1 wherein the modified representation is a manual override via a user interface infrastructure.

4. The method of claim 3 wherein capturing the second trace of execution during the second capture interval further comprises:

applying the modified representation according to an order of precedence from a plurality of configuration sources selected from one or more of a configuration file, an environment variable or a user interface infrastructure.

5. The method of claim 3 wherein capturing the second trace of execution during the second capture interval further comprises:

determining whether the modified representation has priority over a resource consumption threshold; and in response to determining that the modified representation has priority over the resource consumption threshold, allowing the manual override without regard to an amount of resource consumption of the callback.

6. The method of claim 3 wherein capturing the second trace of execution during the second capture interval further comprises:

determining whether the modified representation has priority over a resource consumption threshold; and in response to determining that the modified representation does not have priority over the resource consumption threshold, limiting an overhead resource consumption of the callback with the manual override to the resource consumption threshold.

7. The method of claim 6 wherein a time duration of the second callback is reduced to limit the overhead resource consumption.

8. The method of claim 1, wherein the prior representation represents a first maximum nested depth of capture for a data structure and the modified representation corresponds to a second maximum nested depth of capture for the data structure different from the first.

9. The method of claim 1, wherein the modified representation is pushed to the dynamic configuration in response to the first capture interval exceeding an overhead resource consumption of the callback.

10. A non-transitory computer readable medium including program instructions for execution on one or more processors, the program instructions configured to:

instrument executable code of an application to capture traces of execution of the application on a computer node having a memory, wherein the executable code is instrumented in accordance with a dynamic configuration including a prior representation of a first level of fidelity of trace capture;

establish one or more callbacks to a client library as one or more event-driven capture intervals of the traces during execution of the application, wherein the client library is loaded into a process of the application;

capture a first trace of execution during a first capture interval via the callback to the client library according to the prior representation of the dynamic configuration to capture the first level of fidelity of trace capture for the first trace;

modify the prior representation of the dynamic configuration to a second level of fidelity of trace capture;

capture a second trace of execution during a second capture interval via the callback to the client library according to the modified representation of the dynamic configuration, wherein the modified representation is loaded into the client library and supersedes the prior representation to capture the second level of fidelity of trace capture for the second trace, wherein the process of the application remains running;

compress the traces via the callback to the client library; and send the traces to an agent process via the callback to the client library, the agent process and application process executing on a same operating system.

11. The non-transitory computer readable medium of claim 10, wherein the first and second traces capture execution of one or more of a same method, a same variable, or a same data structure.

12. The non-transitory computer readable medium of claim 10, wherein the modified representation is a manual override via a user interface infrastructure.

13. The non-transitory computer readable medium of claim 12, wherein the program instructions configured to capture the second trace of execution during the second capture interval are further configured to:

apply the modified representation according to an order of precedence from a plurality of configuration sources selected from one or more of a configuration file, an environment variable or a user interface infrastructure.

14. The non-transitory computer readable medium of claim 12, wherein the program instructions configured to capture the second trace of execution during the second capture interval are further configured to:

determine whether the modified representation has priority over a resource consumption threshold; and in response to determining that the modified representation has priority over the resource consumption threshold, allow the manual override without regard to an amount of resource consumption of the callback.

15. The non-transitory computer readable medium of claim 12, wherein the program instructions configured to capture the second trace of execution during the second capture interval are further configured to:
   determine whether the modified representation has priority over a resource consumption threshold; and
   in response to determining that the modified representation does not have priority over the resource consumption threshold, limit an overhead resource consumption of the callback with the manual override to the resource consumption threshold.

16. The non-transitory computer readable medium of claim 15, wherein a time duration of the second callback is reduced to limit the overhead resource consumption.

17. The non-transitory computer readable medium of claim 10, wherein the prior representation represents a first maximum nested depth of capture for a data structure and the modified representation corresponds to a second maximum nested depth of capture for the data structure different from the first.

18. The non-transitory computer readable medium of claim 10, wherein the modified representation is pushed to the dynamic configuration in response to the first capture interval exceeding an overhead resource consumption of the callback.

19. A system comprising:
   a node including a processor and a memory, the memory including an application having executable code linked to a client library with program instructions configured to,
   instrument the executable code to capture traces of execution of the application according to a dynamic configuration including a prior representation of a first level of fidelity of trace capture;
   establish one or more callbacks to a client library as one or more event-driven capture intervals of the traces during execution of the application, wherein the client library is loaded into a process of the application;
   capture a first trace of execution during a first capture interval via the callback to the client library according to the prior representation of the dynamic configuration to capture the first level of fidelity of trace capture for the first trace;
   modify the prior representation of the dynamic configuration to a second level of fidelity of trace capture;
   capture a second trace of execution during a second capture interval via the callback to the client library according to the modified representation of the dynamic configuration, wherein the modified representation is loaded into the client library and supersedes the prior representation to capture the second level of fidelity of trace capture for the second trace, wherein the process of the application remains running;
   compress the traces via the callback to the client library; and
   send the traces to an agent process via the callback to the client library, the agent process and application process executing on a same operating system.

20. The system of claim 19 wherein the first and second traces capture execution of one or more of a same method, a same variable, or a same data structure.

* * * * *